June 9, 1953  G. L. HOFFMAN ET AL  2,641,325
STAIR LIFT HAND TRUCK

Filed June 5, 1950  2 Sheets-Sheet 1

INVENTORS
George L. Hoffman and
BY Simon J. Petersen

Firease my Bishop
ATTORNEYS

June 9, 1953  G. L. HOFFMAN ET AL  2,641,325
STAIR LIFT HAND TRUCK

Filed June 5, 1950  2 Sheets-Sheet 2

INVENTORS
George L. Hoffman and
BY Simon J. Petersen

ATTORNEYS

Patented June 9, 1953

2,641,325

UNITED STATES PATENT OFFICE 2,641,325

STAIR LIFT HAND TRUCK

George L. Hoffman and Simon J. Petersen,
Miami, Fla.

Application June 5, 1950, Serial No. 166,186

3 Claims. (Cl. 180—8)

The invention relates generally to wheeled hand trucks which are pushed and pulled for transporting materials, and more particularly to a hand truck having a lifting mechanism for carrying the truck up or down a stairway.

The conventional hand truck has a pair of wheels at the front end of a frame and a pair of handles at the rear end. These wheels and their axles are made strong and heavy with the wheels of substantial diameter for carrying heavy loads. It is often desirable to transport material on these trucks up and down stairways, but with a heavy load this is a laborious and often a dangerous operation.

It is a general object of the present invention to provide a hand truck having novel mechanism for safely moving the truck up or down a stairway step by step.

Certain prior truck constructions having stair lifts have included a plurality of caster wheels or rollers mounted on the several arms or spokes of a pair of spiders which are rotatable through suitable gearing, either by hand or motor power. Such a construction requires that the arms and casters be spaced apart substantially in proportion to the width of the stair treads and the height of the risers, with the result that the truck is very awkward to manipulate on a level or plane surface.

Moreover, the caster wheels are relatively small and are not adapted to carry heavy loads, especially as the load is carried by only one pair of casters at a time. In using the truck on a level surface the balance of the load may be affected by the relative position of the casters which are carrying the load, which adds to the difficulty of manipulation.

Certain other prior constructions have included pairs of spiders at both ends of the truck with caster wheels on the several arms of the spiders. These constructions are subject to the same disadvantages heretofore enumerated, plus the additional disadvantage of being still more unwieldy when used on a level or plane surface because of the extra pair of spiders at the upper end of the truck. Otherwise the upper pair of spiders must be removed each time the truck is used on a plane surface.

Accordingly, another and more specific object is to provide novel lifting mechanism cooperating with the usual truck wheels for carrying a truck up or down a stairway.

Another object is to provide a truck embodying novel lifting mechanism in which the truck wheels alternately support the truck on successive stair treads as the truck is lifted up or down.

A further object is to provide a truck embodying novel lifting mechanism which does not interfere in any way with the normal operation of the conventional truck wheels on plane surfaces.

A still further object is to provide a novel hand truck embodying lifting mechanism which is inexpensive to manufacture, and easily manipulated with heavy loads either on plane surfaces or up and down stairways, without changing or replacing any parts.

These and other objects are accomplished by the parts, improvements, constructions and combinations comprising the present invention, preferred embodiments of which are shown by way of example in the accompanying drawings as exemplifying the best known modes of carrying out the invention, the invention being described in detail in the specification, and the scope of the invention being defined in the appended claims.

In general terms, the novel hand truck comprising the present invention includes a pair of load-bearing wheels journaled under the front end of the truck frame, said wheels preferably being adjustably mounted eccentric of the wheel axle, lifting arms mounted on the outer ends of the axle, and motor and gear means for rotating the lifting arms relative to the axle to lift the truck from one step to another, the truck wheels supporting the truck on each stair tread while the lever arms are rotating to engage the next tread.

Referring to the drawings, in which preferred embodiments of the invention are shown by way of example:

Similar numerals refer to similar parts throughout the several views of the drawings.

Figure 3:
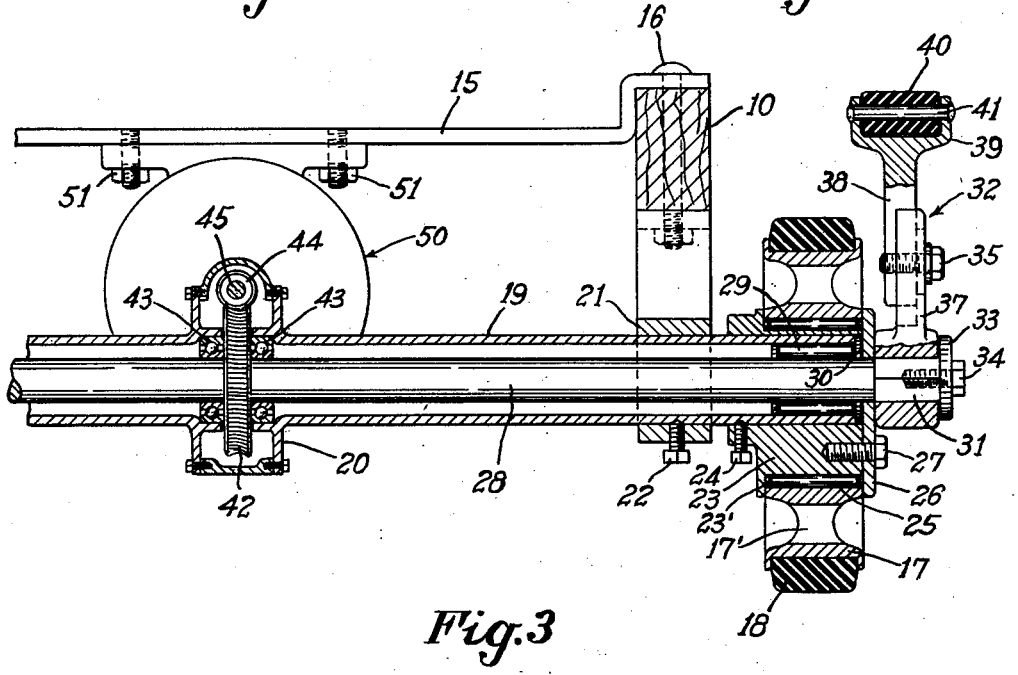
Fig. 3 is an enlarged fragmentary transverse sectional view of the lower end of the truck taken on the axis of the axle.

Referring first to the embodiment of the invention shown in Figs. 1–4, the hand truck of the present invention has the usual side rails 10, which may be of wood as shown, or of lightweight metal, and the upper ends of the rails are provided with hand grips or handles 11. The bottom ends of the rails are connected by a transverse metal lifting member 12 by means of bolts 13, and member 12 has the usual blade 14 projecting upwardly for easy insertion under an article to be lifted and carried on the truck. As shown in Fig. 3, the framework of the truck may include transverse load-supporting straps 15 which may be bolted to the rails 10 by means of bolts 16.

A pair of heavy truck-supporting wheels 17 is located in the usual position under the front end of the truck frame, one at each side thereof. These wheels may be metal of substantially large diameter with a circumferential series of holes 17' therethrough, and preferably have solid rubber tires 18 on their rims. The axle for the wheels 17 is indicated at 19 and is preferably hollow with a gear housing 20 substantially midway of its ends. The end portions of the axle 19 are preferably mounted in brackets 21 which are carried on the rails 10, being connected thereto by the bolts 13 and 16. In Fig. 3 only one side of the truck is shown, because the other side is a duplicate thereof.

Preferably the axle 19 is fixedly mounted in the brackets 21 by set screws 22, and the wheels 17 are mounted on the projecting ends of the axle. Each projecting end of the axle 19 has an eccentric member 23 fixed thereon by a set screw 24, and the outer periphery of the eccentric is cylindrical and constitutes the inner race for a roller bearing 25 on which the wheel 17 is journaled. Thus the wheel is journaled eccentrically of the axle 19, and the eccentric may be adjusted by loosening the screw 24 and rotating it to a different position on the axle.

This adjustment provides for changing the distance between the truck and the floor or supporting surface on which the wheel rolls. Preferably a circumferential series of depressions may be provided on the axle 19 to selectively receive the set screw 24. Each wheel is preferably retained on the axle by means of a retaining plate 26 connected to the front side of the eccentric 23 by a screw 27. The rear side of the eccentric preferably has a shoulder 23' against which the wheel abuts.

A pivot shaft 28 is located co-axially within the hollow axle 19, and is preferably journaled at each end of the axle in roller bearings 29 having outer retaining plates 30 abutting the outer ends of the axle within the eccentrics 23 thereon. The outer ends of the shaft 28 project through the retaining plates 26 and are preferably squared as shown at 31.

Figures 1, 2:
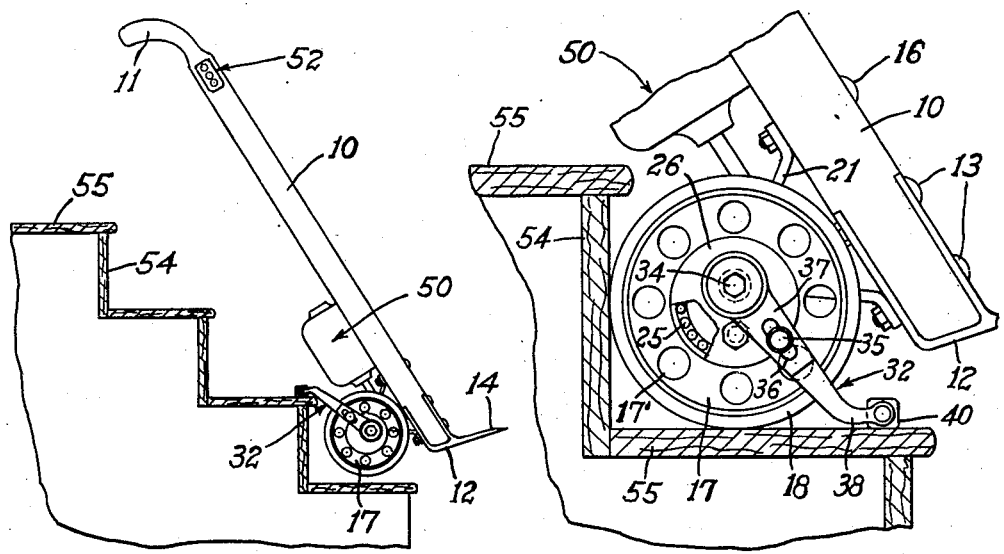
Figure 1 is a side view of the improved truck in position to ascend or descend a stairway.
Fig. 2 is an enlarged side view of the lower end of the truck in a slightly different position on the stairway.

A lifting lever arm indicated generally at 32 is mounted on each squared end 31, and is retained thereon by means of a retaining plate 33 held in place by retaining screw 34 which is threaded into the end of the pivot shaft. As shown in Figs. 2 and 3 each lifting arm 32 projects radially a substantial distance beyond the rim of the adjacent wheel 17 and the length of the arm is dependent somewhat upon the relative dimensions of the wheel and the stair steps to be climbed.

Means for adjusting the length of the arm 32 may consist of a clamping screw 35 extending through a slot 36 in one arm portion 37 and threaded into the other arm portion 38. Accordingly, by removing the clamping screw 35, the arm portion 38 can be extended or retracted relative to the arm portion 37. The outer end of arm portion 38 is preferably curved or bent as shown in Fig. 2 and has a yoke portion 39 with a block 40 of non-skid material such as rubber pivoted therein on a pivot pin 41.

The means for rotating the shaft 28 to rotate the lifting arms 32 relative to the wheels 17 preferably includes a worm gear 42 secured on an intermediate portion of the shaft 28 within the housing 20. Preferably the shaft is journaled in the housing by means of anti-friction bearings 43, and the worm gear meshes with a worm 44 mounted on a driving shaft 45. The shaft 45 is preferably journaled in bearings 46 mounted in the gear housing, and a grease retaining gland 47 may be mounted around the shaft in retaining plates 48 which abut the housing.

The shaft is driven by a suitable electric motor indicated generally at 50 which may be supported on one of the transverse straps 15 of the truck frame if desired, by means of bolts or screws 51. Electric current may be supplied to the motor by means of a conductor cord, in the usual manner, and the cord is preferably made long enough so that it can be plugged into a power supply at the top or bottom of a stairway while allowing the truck to be carried to the other end.

In using the truck on a stairway, after the motor has been connected to the power supply, the operator presses a three-way switch of usual construction indicated generally at 52, located on one of the rails 10 and connected in the conductor cord circuit between the motor and power supply. The switch preferably has three positions, one for ascending a stairway, one for descending, and one for stopping the motor. Prior to starting the motor in either direction, the operator may wish to adjust the eccentrics 23 on the axle 19, so as to adjust the height of the pivot shaft according to the height of the risers 54 between the treads 55 of the stairway. If desired, he may make a further adjustment by extending or shortening the arm 32 in the manner previously described. In Fig. 2 the eccentric is adjusted so that the pivot shaft 28 is located at its greatest height above the stair tread 55 on which it rests.

Now referring to Fig. 2, if the motor is operated to lift the truck upwardly on the stairway, the motor will swing the lift lever arms 32 in a counterclockwise direction so that the blocks 40 at the end of the arms will engage the stair tread 55 next above the wheel, whereupon further rotation will lift the wheels 17 in the manner indicated in Fig. 1, until they rest on the stair tread next above. The non-skid blocks 40 will remain in fixed position on each stair tread until the wheels are raised and land thereon. This operation continues step by step until the stairway is ascended. In descending the stairway, the lever arms 32 are rotated in a clockwise direction and the operation is reversed, with the lever arms 32 and the wheels 17 alternately supporting the truck on each successive tread.

Figure 5:
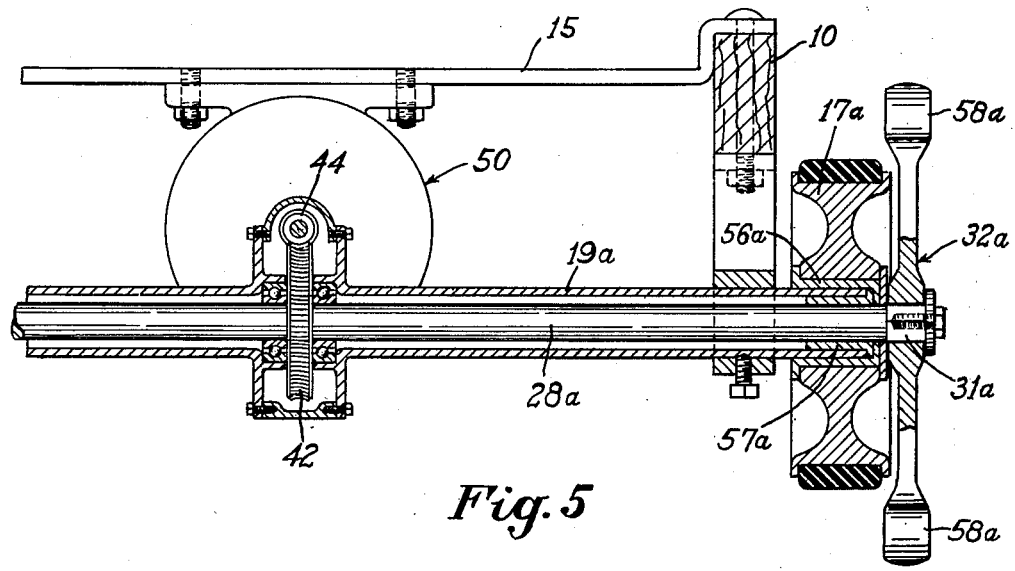
Fig. 5 is a view similar to Fig. 3 of a modified form of the invention.
Figures 4, 6:
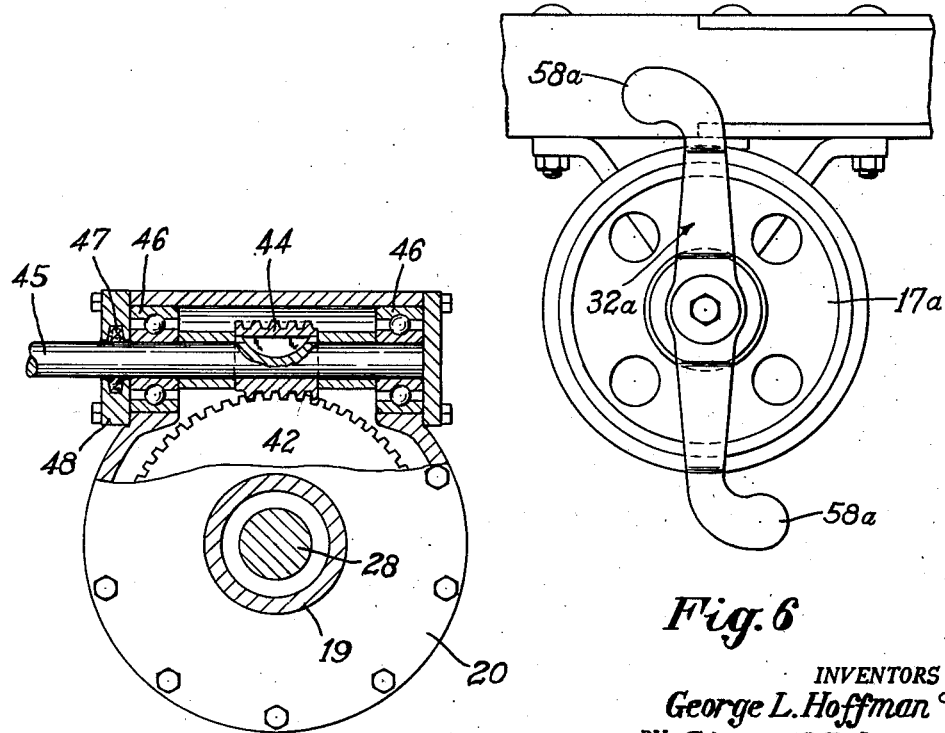
Fig. 4 is a detached enlarged view, partly in section, showing the worm gear drive from the motor to the lifting arm shaft.
Fig. 6 is a fragmentary side elevation thereof.

Referring to the modified form shown in Figs. 5 and 6, the wheels 17a are journaled concentrically on the axle 19a, and the pivot shaft 28a is journaled co-axially within the axle. In this form, ordinary sleeve type bearings 56a and 57a are shown between the wheels and axle and between the shaft and axle, although anti-friction bearings may be used if desired.

The lifting arms 32a in this embodiment are mounted on the squared ends 31a of the pivot shaft, but the arms are double ended, that is, they have two identical portions which extend in diametrically opposite directions from the shaft and terminate beyond the rim of the wheel. Each end of the arm preferably terrminates in a curved tread-engaging portion 58a.

The novel stair lift hand truck comprising the present invention is inexpensive to manufacture and easily manipulated with heavy loads either up or down stairways without changing or replacing any parts because the usual wheels alternate with the lifting arms to support the truck on each tread. When it is desired to use the truck on a level or plane surface, the operator merely stops the lifting levers somewhere within the upper radius of the wheels so that they do not interfere with the normal operation of the truck. In such cases, the manipulation and balance of the hand truck are substantially the same as the ordinary hand truck, and the large diameter wheels 17 provide for easy transportation of heavy loads.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention, the construction, the operation and use of preferred embodiments thereof, and the advantageous new and useful results obtained thereby; the new and useful constructions, and reasonable mechanical equivalents thereof obvious to those skilled in the art, are set forth in the appended claims.

We claim:

1. In a hand truck having a frame and a pair of wheels at its front end, a hollow axle supporting said wheels, means eccentrically journaling said axle, a pivot shaft within said axle and projecting beyond said wheels, means for adjusting the eccentric means rotatively on said axle to adjust the height of said pivot shaft according to the height of the risers of a stairway, lifting arms fixed on the outer ends of said shaft and extending radially beyond the outer peripheries of said wheels, and power means on said truck frame operatively connected with said shaft for rotating said lifting arms relative to said wheels to lift the truck from one step to another of said stairway, the truck wheels alternately supporting the truck on each stair tread while the arms are rotating to the next adjacent stair tread.

2. In a hand truck having a frame and a pair of wheels at its front end, a hollow axle supporting said wheels, means eccentrically journaling said wheels on said axle, a pivot shaft within said axle and projecting beyond said wheels, means for adjusting the eccentric means rotatively on said axle to adjust the height of said pivot shaft according to the height of the risers of a stairway, a lifting arm fixed on each end of said shaft and extending radially beyond the outer peripheries of said wheels, means journaled on the outer ends of said arms for engaging the treads of said stairway, means for adjusting the lengths of said lifting arms, and power means on said truck frame for rotating said pivot shaft to rotate the lifting arms into engagement with successive treads on said stairway, the truck wheels alternately supporting the truck on each stair tread while the arms are rotating toward the next adjacent tread.

3. A hand truck having a frame, a hollow axle mounted under the front end of said frame, a pair of eccentrics adjustably mounted on the ends of said axles, wheels journaled on said eccentrics, a pivot shaft journaled co-axially with said axle and projecting beyond said wheels, said eccentrics being adjustable to raise and lower said pivot shaft with respect to said wheels, lifting arms fixed on the outer ends of said shaft and extending radially beyond said wheels, and power means on said truck frame operatively connected with said shaft for rotating said lifting arms relative to said wheels to engage the stair tread next adjacent to the tread supporting said wheels to lift the truck from one step to another of a stairway.

GEORGE L. HOFFMAN.
SIMON J. PETERSEN.

References Cited in the file of this patent

UNITED STATES PATENTS

| Number | Name | Date |
|---|---|---|
| 709,859 | Baker | Sept. 30, 1902 |
| 1,191,394 | Brown et al. | July 18, 1916 |
| 1,979,598 | Ash | Nov. 6, 1934 |
| 2,004,748 | Dillon | June 11, 1935 |
| 2,400,824 | Jackson | May 21, 1946 |
| 2,467,644 | Wright et al. | Apr. 19, 1949 |

FOREIGN PATENTS

| Number | Country | Date |
|---|---|---|
| 577,797 | Germany | July 13, 1932 |
| 650,856 | France | Feb. 12, 1929 |